United States Patent
Kapoor et al.

(10) Patent No.: US 10,726,725 B2
(45) Date of Patent: Jul. 28, 2020

(54) DYNAMICALLY DESIGNING STREET-PARKING POLICIES FOR EVENTS

(71) Applicant: International Business Machines Corporation, Armonk, NY (US)

(72) Inventors: Meenal Kapoor, Gurgaon (IN); Vinayak Sastri, Bangalore (IN); Arvind Agarwal, New Delhi (IN); Kuntal Dey, New Delhi (IN); Seema Nagar, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 95 days.

(21) Appl. No.: 16/018,636

(22) Filed: Jun. 26, 2018

(65) Prior Publication Data

US 2019/0392710 A1    Dec. 26, 2019

(51) Int. Cl.
*G08G 1/14* (2006.01)
*G08G 1/065* (2006.01)
*G06Q 10/06* (2012.01)

(52) U.S. Cl.
CPC ....... *G08G 1/147* (2013.01); *G06Q 10/06393* (2013.01); *G08G 1/065* (2013.01); *G08G 1/148* (2013.01)

(58) Field of Classification Search
CPC ........ G08G 1/147; G08G 1/065; G08G 1/148; G06Q 10/06393
USPC .............................. 340/932.2; 705/6, 13, 412
See application file for complete search history.

(56) References Cited

U.S. PATENT DOCUMENTS

| | | | |
|---|---|---|---|
| 3,349,368 A * | 10/1967 | Kates | G08G 1/065 340/913 |
| 6,107,942 A | 8/2000 | Yoo et al. | |
| 8,306,734 B2 * | 11/2012 | Mathews | G01C 21/3685 701/408 |
| 9,870,707 B2 * | 1/2018 | Korman | G08G 1/147 |
| 10,074,278 B1 * | 9/2018 | Woodard | G08G 1/148 |
| 2005/0280555 A1 | 12/2005 | Warner, IV | |
| 2008/0033640 A1 * | 2/2008 | Amano | G01C 21/3476 701/414 |

(Continued)

OTHER PUBLICATIONS

Cao et al. A Parking-state-based Transition Matrix of Traffic on Urban Networks, Transportation Research Procedia, vol. 7, 2015, pp. 149-169.

(Continued)

*Primary Examiner* — Adnan Aziz
(74) *Attorney, Agent, or Firm* — Ryan, Mason & Lewis, LLP

(57) ABSTRACT

Methods, systems, and computer program products for dynamically designing street-parking policies for events are provided herein. A computer-implemented method includes generating a parking map for each of one or more events that occurred within a specified geographic area; generating, for each of the parking maps, one or more traffic condition maps; generating, for each of the one or more events, based on (i) each parking map and (ii) its associated traffic condition map, an impact map for the corresponding event; adjusting, for a subsequent event within the specified geographic area, one or more street-parking policies based on the impact on parking suitability and street usability represented by the generated impact maps, and outputting the one or more adjusted street-parking policies.

19 Claims, 5 Drawing Sheets

(56) References Cited

U.S. PATENT DOCUMENTS

| | | | |
|---|---|---|---|
| 2008/0291054 A1* | 11/2008 | Groft | G06Q 30/0284 340/932.2 |
| 2011/0099126 A1 | 4/2011 | Belani et al. | |
| 2013/0265174 A1* | 10/2013 | Scofield | G01C 21/34 340/932.2 |
| 2013/0268187 A1* | 10/2013 | Scofield | G01C 21/3685 701/400 |
| 2014/0132767 A1* | 5/2014 | Sonnabend | G08G 1/144 348/148 |
| 2014/0266800 A1* | 9/2014 | Koukoumidis | G08G 1/141 340/932.2 |
| 2014/0266801 A1* | 9/2014 | Uppal | G08G 1/144 340/932.2 |
| 2015/0066607 A1 | 3/2015 | Fiorucci et al. | |
| 2015/0177002 A1* | 6/2015 | Sourani | G01C 21/26 701/532 |
| 2015/0294431 A1* | 10/2015 | Fiorucci | G06Q 50/26 705/13 |
| 2015/0371541 A1* | 12/2015 | Korman | G08G 1/147 340/932.2 |
| 2016/0111004 A1* | 4/2016 | Delmas | G08G 1/147 340/932.2 |
| 2016/0171891 A1* | 6/2016 | Banatwala | G08G 1/143 340/932.2 |
| 2016/0196747 A1* | 7/2016 | Tsyrklevich | G08G 1/143 701/532 |
| 2016/0307047 A1* | 10/2016 | Krishnamoorthy | G06T 7/73 |
| 2017/0018183 A1* | 1/2017 | Rosen | G06Q 10/02 |
| 2017/0039779 A1 | 2/2017 | Vander Helm et al. | |
| 2018/0060797 A1* | 3/2018 | Stefik | G06Q 10/063116 |
| 2018/0232583 A1* | 8/2018 | Wang | G06K 9/00812 |
| 2018/0240341 A1* | 8/2018 | Hetz | G08G 1/096838 |
| 2018/0301031 A1* | 10/2018 | Naamani | G06K 9/00771 |

OTHER PUBLICATIONS

Qian et al. Optimal Dynamic Pricing for Morning Commute Parking with Occupancy Information, Transportmetrica A: Transport Science, vol. 11, Issue 4, 2015.

* cited by examiner

DYNAMICALLY DESIGNING STREET-PARKING POLICIES FOR EVENTS

FIELD

The present application generally relates to information technology, and, more particularly, to automated parking management techniques.

BACKGROUND

Open-street parking is a common practice, regardless of the presence of controlled and closed parking areas. Also, governance entities maintain and/or modify policies pertaining to which parts of certain roads are permissible or impermissible for parking, adding to the variability and complexity of open-street parking. For example, depending upon contextual parameters, such as time of the day, time of year, locality, nearby events, etc., some roads (or parts thereof) are kept open for vehicle passage and/or parking at per-designated times.

Existing parking management approaches include identifying empty parking slots. However, such approaches are not capable of assisting in analyzing the impact of parking on overall traffic conditions and/or road usability. Additionally, such existing approaches are not capable of using such traffic condition impact information to improve parking decisions and/or recommendations over time.

SUMMARY

In one embodiment of the present invention, techniques for dynamically designing street-parking policies for events are provided. An exemplary computer-implemented method can include generating a parking map for each of one or more events that occurred within a specified geographic area, wherein each parking map comprises an identification of one or more permitted street parking slots on one or more streets within the specified geographic area during a specified period of time associated with the given event. Additionally, the method can include generating, for each of the parking maps, one or more traffic condition maps, depicting one or more traffic conditions during the specified period of time associated with the given event, and generating, for each of the one or more events, based at least in part on (i) each parking map and (ii) its associated traffic condition map, an impact map for the corresponding event, wherein each impact map represents the impact of one or more street parking patterns on parking suitability and street usability, and wherein generating each impact map comprises computing one or more key performance indicators related to the given event. Further, such a method includes adjusting, for a subsequent event within the specified geographic area, one or more street-parking policies, where adjusting is based at least in part on the impact on parking suitability and street usability represented by the generated impact maps, and outputting the one or more adjusted street-parking policies to at least one user.

In another embodiment of the invention, an exemplary computer-implemented method can include steps of dividing each of one or more street-parking areas within a specified geographic area into multiple zones, and generating a parking map for each of one or more events that occurred within the specified geographic area, wherein each parking map comprises an identification of one or more permitted street parking slots on one or more streets within each of the multiple zones during a specified period of time associated with the given event. Additionally, such a method can also include determining, for each of the multiple zones, one or more correlations between (i) one or more of the generated parking maps, (ii) documented parking conditions at one or more points during the specified period of time associated with each of the one or more events, and (iii) one or more of the generated traffic condition maps. Further, such a method can include generating, for each of the one or more events, based at least in part on (i) the one or more determined correlations, (ii) one or more constraints related to street-parking within the specified geographic area, and (iii) one or more items of data derived from one or more sensors, an impact map for the corresponding event, wherein each impact map represents the impact of one or more street parking patterns on parking suitability and street usability, and wherein generating each impact map comprises computing one or more key performance indicators related to the given event.

Another embodiment of the invention or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Figure 1:
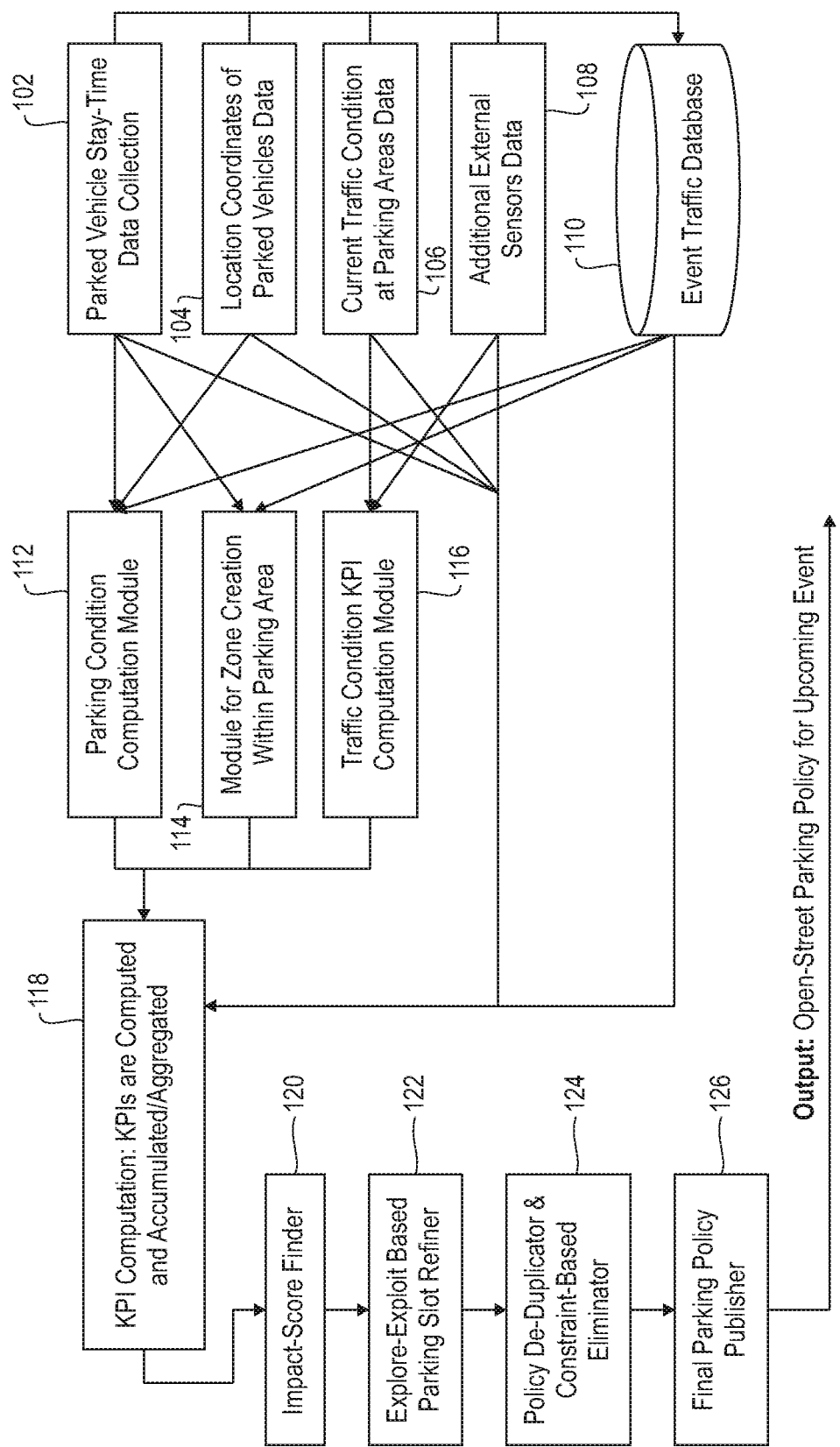
FIG. 1 is a diagram illustrating system architecture, according to an exemplary embodiment of the invention.

As described herein, an embodiment of the present invention includes dynamically designing open-street parking policies for events. At least one embodiment of the invention includes automatically designing and dynamically refining open-street parking policies in connection with one or more venues and/or localities, to reduce and/or minimize local traffic impact while satisfying parking requirement constraints. In refining such designed policies, one or more embodiments of the invention include adopting the policies to event types, localities, estimated visitor statistics and estimated traffic impacts.

Additionally, at least one embodiment of the invention includes collecting parking time for vehicles that are parked on streets and have not moved for a predefined duration of time, and collecting traffic data such as, for example, the number of vehicles on the street, the number of vehicles already parked, the number of parking slots, etc. Such an embodiment can also include analyzing the collected data, as further detailed herein, to derive one or more dynamic parking policies to minimize traffic impact.

A parking map (indicating, for example, what parking policy was permitted, which slots at which street-positions were allowed and were actually used for parking), as well as a time series of which parking slots were occupied at what times, can be generated and/or obtained for one or more events that occurred in connection with a given venue. Additionally, one or more embodiments of the invention can include generating a traffic condition map for different times for each of the parking maps for each of one or more recorded instances. As used herein, a recorded instance refers to a snapshot of parking information. For example, such a snapshot can include, for one or more events at a given venue, which parking slots were occupied and for how long. Additional inputs can also be obtained in connection with each recorded instant (such as, for example, vehicle honks captured by one or more microphones, along with sound source localization).

Using such maps, the parking areas can be divided into multiple zones (for example, north, east, west and south zones of a given venue). For each parking zone, one or more correlations can be drawn between (a) the parking map, (b) actual parking conditions at different times, and (c) the traffic condition maps at those times. The correlations can include associations and/or patterns among relevant parking policies, actual parking conditions, and traffic conditions. For instance, if a parking policy indicates that "Parking is allowed in the north zone," such a policy can result in a correlation that many cars are parked at Street X and moderate traffic conditions develop on Street Y.

As further detailed herein, at least one embodiment of the invention includes generating an impact-map based on multiple key performance indicators (KPIs), wherein the impact map represents the impact of one or more open-street parking patterns. Such impact can include, for example, the impact on traffic conditions, including pedestrian traffic. Additionally, for a subsequent event, similar to a previous event, of an expected similar scale, adjustments can be made to a designed parking policy so that the impact score is minimized. Such a minimization can be carried out by refining the parking maps such that the function that combines the KPI measures yields a minimized value. The updated (refined) parking map can then be exported and/or output as a parking policy design.

FIG. 1 is a diagram illustrating system architecture, according to an embodiment of the invention. By way of illustration, FIG. 1 depicts various collections of data, including parked vehicle stay-time data 102, location coordinates of parked vehicles data 104, current traffic conditions at parking areas data 106, and additional external sensor data 108 (such as, for example, data derived from a microphone array, one or more cameras, etc.). Such data, as further described herein, can be stored and/or maintained in an event traffic database 110, and can also utilize various software modules including a parking condition computation module 112, a parking area zone creation module 114, a traffic condition KPI computation module 116 and/or a KPI computation module 118.

One or more embodiments of the invention include utilizing bootstrapping and meta-inputs. In connection with bootstrapping, a parking map can be (manually) created using permitted parking zones, and an estimate can be generated (based, for example, on earlier video recordings, if available), wherein the estimate pertains to which parking slots were occupied during given temporal periods. Meta-inputs, as noted above, can include a map of roads within a given threshold distance (for example, the maximum distance within which parking for a given event will be supported by one or more policies), as well as the location of the given event venue. By way of example, one or more satellite maps can be used to determine the event venue location, as well as to identify the roads provided within a given proximity of the determined location.

Additionally, one or more embodiments of the invention can include ongoing data collection input obtainment. For an ongoing event (for example, starting from a threshold time before the event starts, and continuing until a threshold time after the event ends), such an embodiment can include collecting (using, for example, a satellite map) one or more items of additional data. Such data can include, for example, stay-time data 102 pertaining to vehicles that are parked on the relevant streets (that is, completely non-moving for at least a threshold duration of time), as well as parking slot location data 104 (in the form of coordinate locations, for example) pertaining to where the vehicles are parked. Also, such data can additionally include, for example, relevant traffic conditions data 106 (for example, how many non-parked/moving vehicles are on a given portion of road, the number of vehicles that have entered the given portion of road, the number of vehicles that have exited the given portion of road, how many vehicles are parked at a given instant, etc.), as well as one or more items of sensor-derived data 108 for each of one or more recorded instances (such as vehicle horns/honks captured via an array of microphones, along with sound source localization information related thereto).

In an embodiment such as depicted in FIG. 1, data, such as detailed above and depicted in FIG. 1, collected for a current event can be fed back into a central server and recorded in database 110. For processing a subsequent or next event, the collected data are provided as inputs to modules 112, 114, 116 and/or 118, as further detailed herein.

For each known past event (including bootstrapping cases), an open-street parking map is generated and/or retrieved from database 110, wherein such a map includes the parking policy for that event (that is, which parking slots at which positions on which road were permitted for vehicle parking). Additionally, based on the collected data, a time series (as recorded in connection with each event) can be generated and/or retrieved that provides a record of which parking slots were occupied at what times for that event. A traffic condition map can be generated and/or retrieved via module 116 for different times for each of the parking maps for each of the recorded event instances. Additional data 108 can also be utilized by module 116 in determining one or more traffic condition KPIs.

As also depicted in FIG. 1, at least one embodiment of the invention, via module 114, includes creating zones and zone-level correlations within one or more parking areas. The parking areas can be divided into several zones (for example, north, east, west and south zones of a given venue), and zone division can be made manually and/or via one or more automated techniques. Such techniques can include, for example, clustering techniques (such as k-means clustering), which can be used for identifying parking zones.

Additionally, heat map-based visual clustering can be performed, wherein a heat map can be generated to represent the density of vehicles parked per a given area. Further, graph partitioning techniques can also be used, wherein in creating a graph, each vehicle represents a vertex, and edges connect one or more vehicles to other vehicles that are within a threshold and/or pre-determined distance.

For each parking zone, a correlation can be drawn between (i) one or more parking policies, (ii) parking conditions at different times (determined via module 112, for example), and (iii) traffic condition maps (determined via module 112, for example) at those times. In at least one embodiment of the invention, a traffic condition map can include elements such as pedestrian traffic, the number of vehicles on road, the average speed of those vehicles, the average time taken by those vehicles travelling from one end of a zone to another end, etc. The parking policy of a given (previous) day can be identified by a policy identifier (ID), and the actual parking conditions at a given instant of time can include a measure of how many vehicles were parked at that instant, where (the set of locations) the vehicles were parked, and a free road map via which passing vehicles (not intending to park) can flow along the road. Additionally, traffic conditions at that time can also be utilized, wherein such traffic conditions can include the number of vehicles passing through the area, the average number of vehicles entering and exiting each given zone, the average rate of movement and/or average waiting time, etc.

As also depicted in FIG. 1, KPIs can be computed and accumulated and/or aggregated via module 118 to generate an impact score. In one or more embodiments of the invention, module 118 creates an impact map, based on a set of KPIs, to represent the impact of open-street parking patterns. Such KPIs can include, for example, the number of vehicles parked at a given instance of time, the locations of such parked vehicles (for example, which part of which zone are the vehicles parked), the percentage/fraction of the road that is being used for parking, the maximum, minimum, and average width of free road, and the number of times the road has become wider and narrower (due to non-consecutive parking) such that the length (in terms of size/distance) of the wider/narrower portion is longer than a given threshold length.

Additionally, such KPIs can also include, for example, the rate at which vehicles enter, exit and park for each recorded instant, the average speed of movement and/or waiting time per vehicle, the relative value of each recorded instant with respect to the event (how far from the start of the event is the recorded instant, how far from the expected ending of the event is the recorded instant, etc.), as well as the number of people expected as participants and/or attendees of the event (this can be obtained, for example, via ticket sale data, social media listening, publish-subscribe (pub-sub) systems whereby individuals express intentions to visit or attend the event, etc.). Further, the KPIs computed via module 118 can also include one or more sensor-derived inputs 108 such as the number of vehicle honks per unit of time, etc.

Using such KPIs computed by module 118, module 120 can generate an impact score as a combination (function) of multiple such KPIs that constitute the impact map. By way of example, a situation wherein traffic speed is maximized and the number of vehicles parked is also maximized (that is, a function of these two KPIs is maximized, providing a joint maximization), can provide minimized impact scores.

Using inputs from module 118 and module 120, at least one embodiment of the invention can include carrying out parking map refinement and policy design tasks. For a given future event at a given venue that needs a parking policy rollout, such an embodiment can include using the impact scores computed via module 120 in connection with previous events at the same venue, to determine the minimum values of the impact scores. An impact score, as detailed herein, can include a numeric value comprising multiple KPIs. Additionally, an impact score can be generated by combining multiple KPIs using one or more methods (such as, for example, weighted average) to arrive at the single numeric score. Using an initial parking policy as a seed, one or more embodiments of the invention include implementing (before deployment of the parking policy) an explore-exploit mechanism via module 122 in connection with the parking slots at the venue, for the purpose of refining the parking slots. The above-noted initial parking policy can be obtained, for example, based on the impact scores from previous events. As also noted above, an explore-exploit mechanism can indicate that an existing past behavior is to be exploited, while at the same time, new territories are also explored.

By way of example, for each open-street parking slot that lies on a boundary of the venue area (for instance, any slot that has a common border shared with the open-for-vehicles part of a street where the traffic can continue to flow during the event), at least one embodiment of the invention can implement module 122 to generate a number with a high probability of retention ("exploit") and a low probability of perturbation ("explore"). By way of example and illustration, assume that a number is randomly generated with a threshold such as 0.9. This means that any time a randomly-generated number between 0 and 1 comes out to be less than the assumed threshold, an explore action will be taken (in lieu of an exploit action). Additionally, as used herein, retention and perturbation refer to the retention/perturbation of a parking slot. If a random selection turns out to be a retention option, no action is taken. If a random selection turns out to be a perturbation option, new parking venues are explored, considering relevant KPIs.

Accordingly, if an explore element is generated, such an embodiment can include determining a location from the open-for-vehicles part of the street(s) (relevant to the event area). In generating this number, such an embodiment can include using a relatively higher probability of determining or identifying a location that has a shared edge with another open-street parking slot, and a relatively higher probability of determining or identifying a location on a street where the average traffic flow (that is, the number of vehicles entering and exiting the street) is relatively lower, as well as one or more additional factors (with respect to the computed KPIs) that are provided by the policy framework.

Using policy de-duplicator and constraint-based eliminator module 124, one or more embodiments of the invention include eliminating the initial parking policy, if the policy is the same as another known parking policy used in the past and the impact score (associated with the policy) is already known. Also via module 124, such an embodiment can include eliminating the initial parking policy if the policy violates any external constraints (such as, for example, minimum width of a road, maximum number of allowed vehicles that can be parked on a road, special days such as national days on which, by policy, some parts of some streets cannot be used for parking, times of day when some parts of some streets cannot be used for parking, etc.). Further, a refined parking map can be exported, via final parking policy publisher module 126, as a parking policy design for the upcoming event, which represents the output of the system depicted in FIG. 1. As used herein, a refined parking map includes the original parking map with one or more new parking slots that have been identified (based on consideration of one or more KPIs) in an exploration step.

Additionally, one or more embodiments of the invention include utilizing, in carrying out the techniques detailed herein, one or more external technical components, systems, assets and/or capabilities. Such external components, systems, assets and/or capabilities can include, for example, satellite-based systems that can provide timely traffic condition estimates at a given location. Also, such external components, systems, assets and/or capabilities can include, for example, publish-subscribe systems and social platforms, such as social platforms with "mention" features that can be enabled for listening for and/or detecting mentions of a venue and a date/time of an event. Such external components, systems, assets and/or capabilities can additionally include, for example, a database derived from and/or maintained by regulatory authorities for pushing raw data and analyzed (processed) information (which can be used to maintain traffic condition history, etc.), as well as an array of microphone sensors (as further described herein).

Figure 2:
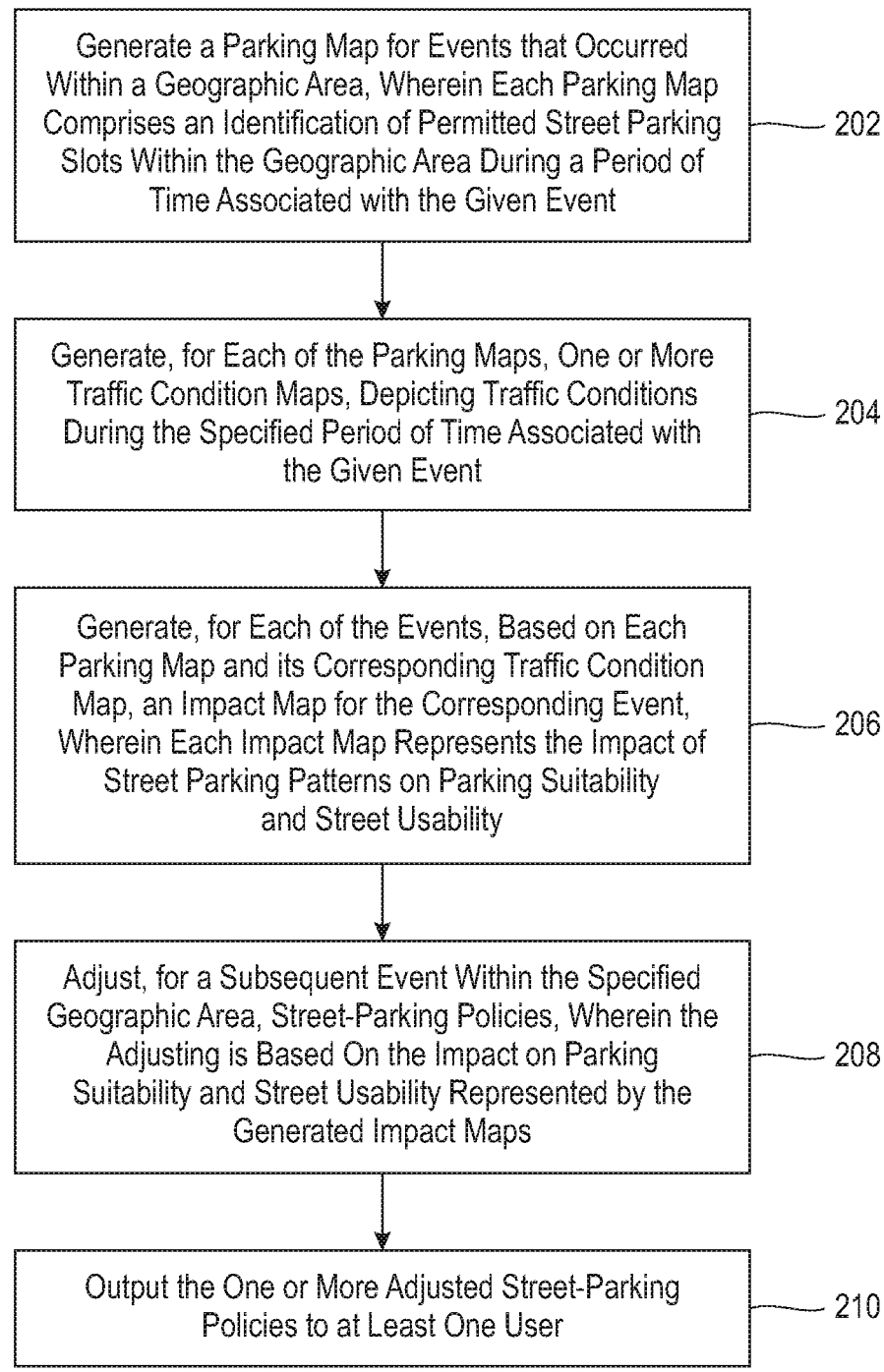
FIG. 2 is a flow diagram illustrating techniques according to an embodiment of the invention.

FIG. 2 is a flow diagram illustrating techniques according to an embodiment of the present invention. Step 202 includes generating a parking map for each of one or more events that occurred within a specified geographic area, wherein each parking map comprises an identification of one or more permitted street parking slots on one or more streets within the specified geographic area during a specified period of time associated with the given event. Each generated parking map can include a time series of which of the parking slots were occupied by one or more vehicles. Step 204 includes generating, for each of the parking maps, one or more traffic condition maps, depicting one or more traffic conditions during the specified period of time associated with the given event.

Step 206 includes generating, for each of the one or more events, based at least in part on (i) each parking map and (ii) its associated traffic condition map, an impact map for the corresponding event, wherein each impact map represents the impact of one or more street parking patterns on parking suitability and street usability, and wherein generating each impact map comprises computing one or more KPIs related to the given event. The KPIs can include, for example, the number of vehicles parked at one or more given points of time, the location of each parked vehicle at one or more given points of time, the amount of the one or more streets that is free for vehicle traffic at one or more given points of time, the arrival rate of vehicles in the specified geographic area from one or more directions, the number of vehicles entering the specified geographic area during a specified period of time associated with the given event, the number of vehicles exiting the specified geographic area during a specified period of time associated with the given event, and/or an average amount of time, per vehicle, spent in the specified geographic area during a specified period of time associated with the given event.

Additionally, in one or more embodiments of the invention, generating each impact map can be based at least in part on one or more items of data derived from one or more sensors and/or one or more constraints related to street-parking within the specified geographic area.

Step 208 includes adjusting, for a subsequent event within the specified geographic area, one or more street-parking policies, wherein the adjusting is based at least in part on the impact on parking suitability and street usability represented by the generated impact maps. Step 210 includes outputting the one or more adjusted street-parking policies to at least one user. The techniques depicted in FIG. 2 can additionally include generating (and outputting) a parking map for the subsequent event based at least in part on the one or more adjusted street-parking policies.

Also, an additional embodiment of the invention includes dividing each of one or more street-parking areas within a specified geographic area into multiple zones, and generating a parking map for each of one or more events that occurred within the specified geographic area, wherein each parking map comprises an identification of one or more permitted street parking slots on one or more streets within each of the multiple zones during a specified period of time associated with the given event. Additionally, such an embodiment can also include determining, for each of the multiple zones, one or more correlations between (i) one or more of the generated parking maps, (ii) documented parking conditions at one or more points during the specified period of time associated with each of the one or more events, and (iii) one or more of the generated traffic condition maps. Further, such an embodiment can include generating, for each of the one or more events, based at least in part on (i) the one or more determined correlations, (ii) one or more constraints related to street-parking within the specified geographic area, and (iii) one or more items of data derived from one or more sensors, an impact map for the corresponding event, wherein each impact map represents the impact of one or more street parking patterns on parking suitability and street usability, and wherein generating each impact map comprises computing one or more key performance indicators related to the given event.

The techniques depicted in FIG. 2 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 2 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 3:
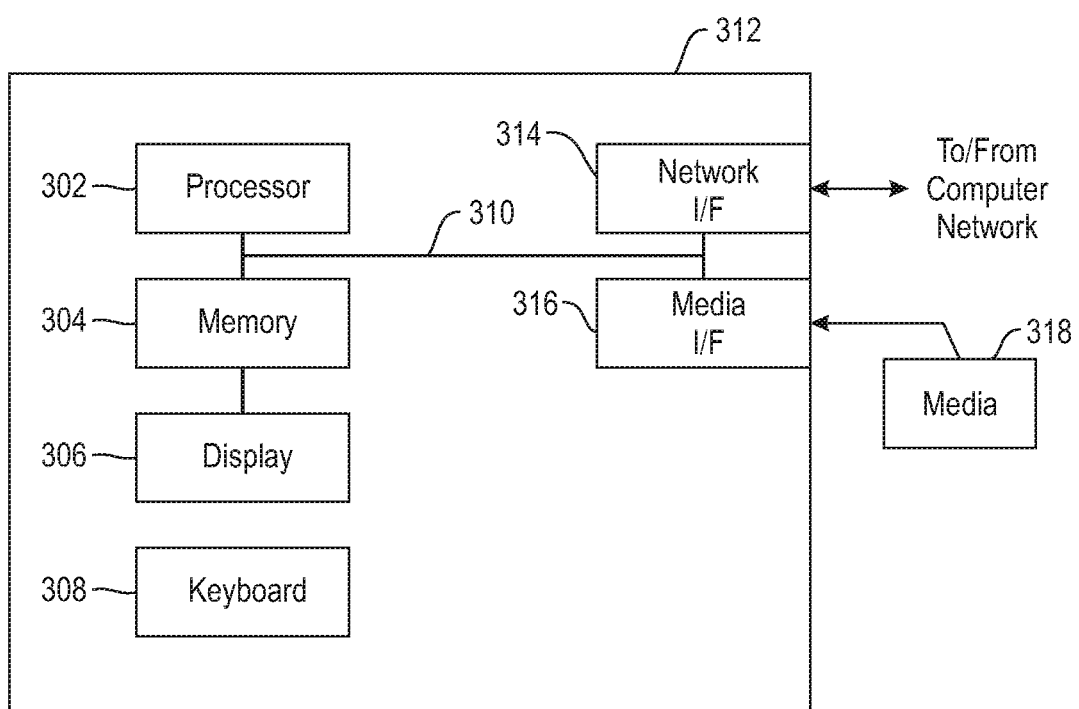
FIG. 3 is a system diagram of an exemplary computer system on which at least one embodiment of the invention can be implemented.

Additionally, an embodiment of the present invention can make use of software running on a computer or workstation. With reference to FIG. 3, such an implementation might employ, for example, a processor 302, a memory 304, and an input/output interface formed, for example, by a display 306 and a keyboard 308. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 302, memory 304, and input/output interface such as display 306 and keyboard 308 can be interconnected, for example, via bus 310 as part of a data processing unit 312. Suitable interconnections, for example via bus 310, can also be provided to a network interface 314, such as a network card, which can be provided to interface with a computer network, and to a media interface 316, such as a diskette or CD-ROM drive, which can be provided to interface with media 318.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 302 coupled directly or indirectly to memory elements 304 through a system bus 310. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 308, displays 306, pointing devices, and the like) can be coupled to the system either directly (such as via bus 310) or through intervening I/O controllers (omitted for clarity).

Network adapters such as network interface 314 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 312 as shown in FIG. 3) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 302. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that implementation of the teachings recited herein are not limited to a particular computing environment. Rather, embodiments of the present invention are capable of being implemented in conjunction with any type of computing environment now known or later developed.

For example, cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
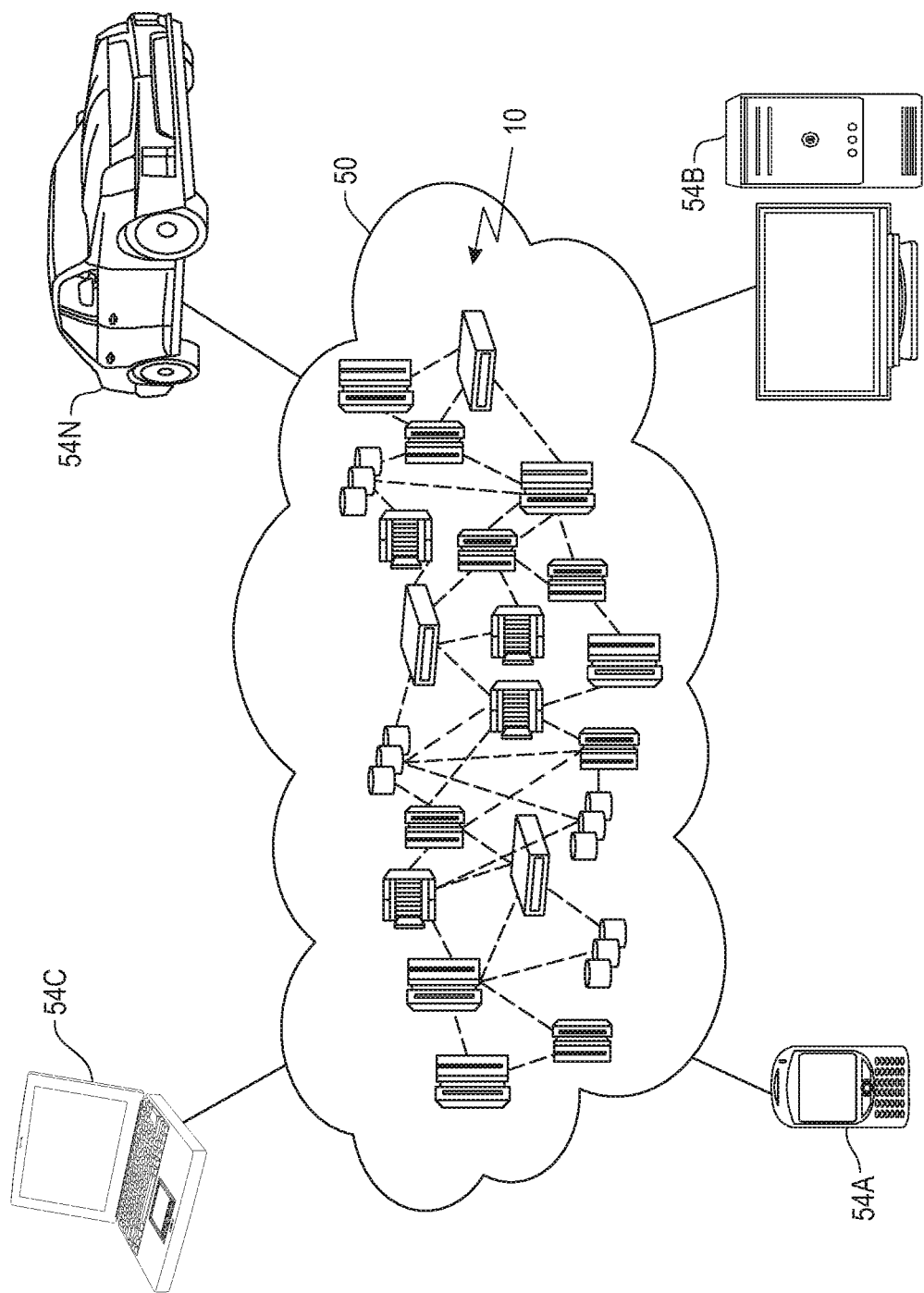
FIG. 4 depicts a cloud computing environment according to an embodiment of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
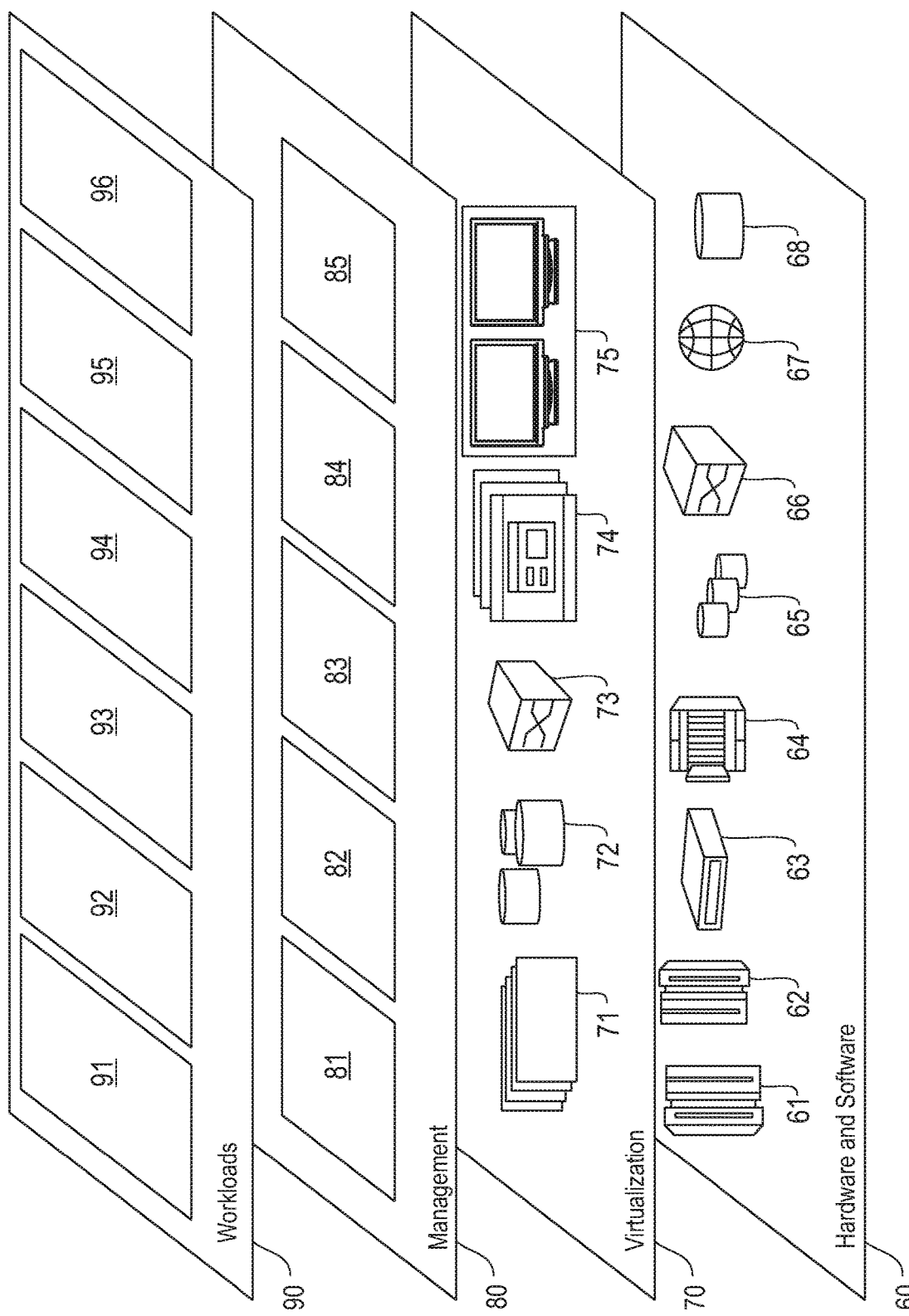
FIG. 5 depicts abstraction model layers according to an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and parking policy designing 96, in accordance with the one or more embodiments of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, open-street parking policy generation for an upcoming current event, based upon past events and expectations at the time of the upcoming current event.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, the method comprising steps of:
generating a parking map for each of one or more events that occurred within a specified geographic area, wherein each parking map comprises an identification of one or more permitted street parking slots on one or more streets within the specified geographic area during a specified period of time associated with the given event;
generating, for each of the parking maps, one or more traffic condition maps, depicting one or more traffic conditions during the specified period of time associated with the given event;
generating, for each of the one or more events, based at least in part on (i) each parking map and (ii) its associated traffic condition map, an impact map for the corresponding event, wherein each impact map represents the impact of one or more street parking patterns on parking suitability and street usability, and wherein generating each impact map comprises computing one or more key performance indicators related to the given event;
adjusting, for a subsequent event within the specified geographic area, one or more street-parking policies, wherein said adjusting is based at least in part on reducing the impact on parking suitability and street usability represented by the generated impact maps; and
outputting the one or more adjusted street-parking policies to at least one user;
wherein the steps are carried out by at least one computing device.

2. The computer-implemented method of claim 1, wherein each generated parking map comprises a time series of which of the parking slots were occupied by one or more vehicles.

3. The computer-implemented method of claim 1, wherein the one or more key performance indicators comprises the number of vehicles parked at one or more given points of time.

4. The computer-implemented method of claim 1, wherein the one or more key performance indicators comprises the location of each parked vehicle at one or more given points of time.

5. The computer-implemented method of claim 1, wherein the one or more key performance indicators comprises the amount of the one or more streets that is free for vehicle traffic at one or more given points of time.

6. The computer-implemented method of claim 1, wherein the one or more key performance indicators comprises the arrival rate of vehicles in the specified geographic area from one or more directions.

7. The computer-implemented method of claim 1, wherein the one or more key performance indicators comprises the number of vehicles entering the specified geographic area during a specified period of time associated with the given event.

8. The computer-implemented method of claim 1, wherein the one or more key performance indicators comprises the number of vehicles exiting the specified geographic area during a specified period of time associated with the given event.

9. The computer-implemented method of claim 1, wherein the one or more key performance indicators comprises an average amount of time, per vehicle, spent in the specified geographic area during a specified period of time associated with the given event.

10. The computer-implemented method of claim 1, wherein said generating each impact map is based at least in part on one or more items of data derived from one or more sensors.

11. The computer-implemented method of claim 1, wherein said generating each impact map is based at least in part on one or more constraints related to street-parking within the specified geographic area.

12. The computer-implemented method of claim 1, comprising:
generating a parking map for the subsequent event based at least in part on the one or more adjusted street-parking policies.

13. A computer program product comprising a non-transitory computer readable storage medium having program instructions embodied therewith, the program instructions executable by a computing device to cause the computing device to:
generate a parking map for each of one or more events that occurred within a specified geographic area, wherein each parking map comprises an identification of one or more permitted street parking slots on one or more streets within the specified geographic area during a specified period of time associated with the given event;
generate, for each of the parking maps, one or more traffic condition maps, depicting one or more traffic conditions during the specified period of time associated with the given event;
generate, for each of the one or more events, based at least in part on (i) each parking map and (ii) its associated traffic condition map, an impact map for the corresponding event, wherein each impact map represents the impact of one or more street parking patterns on parking suitability and street usability, and wherein generating each impact map comprises computing one or more key performance indicators related to the given event;
adjust, for a subsequent event within the specified geographic area, one or more street-parking policies, wherein said adjusting is based at least in part on reducing the impact on parking suitability and street usability represented by the generated impact maps; and
output the one or more adjusted street-parking policies to at least one user.

14. The computer program product of claim 13, wherein each generated parking map comprises a time series of which of the parking slots were occupied by one or more vehicles.

15. The computer program product of claim 13, wherein said generating each impact map is based at least in part on one or more items of data derived from one or more sensors.

16. The computer program product of claim 13, wherein said generating each impact map is based at least in part on one or more constraints related to street-parking within the specified geographic area.

17. The computer program product of claim 13, wherein the program instructions executable by a computing device further cause the computing device to:
generate a parking map for the subsequent event based at least in part on the one or more adjusted street-parking policies.

18. A system comprising:
a memory; and
at least one processor operably coupled to the memory and configured for:
generating a parking map for each of one or more events that occurred within a specified geographic area, wherein each parking map comprises an identification of one or more permitted street parking slots on one or more streets within the specified geographic area during a specified period of time associated with the given event;
generating, for each of the parking maps, one or more traffic condition maps, depicting one or more traffic conditions during the specified period of time associated with the given event;
generating, for each of the one or more events, based at least in part on (i) each parking map and (ii) its associated traffic condition map, an impact map for the corresponding event, wherein each impact map represents the impact of one or more street parking patterns on parking suitability and street usability, and wherein generating each impact map comprises computing one or more key performance indicators related to the given event;
adjusting, for a subsequent event within the specified geographic area, one or more street-parking policies, wherein said adjusting is based at least in part on reducing the impact on parking suitability and street usability represented by the generated impact maps; and
outputting the one or more adjusted street-parking policies to at least one user.

19. The system of claim 18, wherein the at least one processor is further configured for:
generating a parking map for the subsequent event based at least in part on the one or more adjusted street-parking policies.

* * * * *